US012069476B2

(12) United States Patent
Tsuchihashi

(10) Patent No.: US 12,069,476 B2
(45) Date of Patent: Aug. 20, 2024

(54) COMMUNICATION APPARATUS, CONTROL METHOD FOR COMMUNICATION APPARATUS, AND STORAGE MEDIUM STORING PROGRAM

(71) Applicant: CANON KABUSHIKI KAISHA, Tokyo (JP)

(72) Inventor: Masakazu Tsuchihashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 17/740,138

(22) Filed: May 9, 2022

(65) Prior Publication Data
US 2022/0386122 A1 Dec. 1, 2022

(30) Foreign Application Priority Data
May 26, 2021 (JP) .................................. 2021-088229

(51) Int. Cl.
*H04W 12/06* (2021.01)
*G06F 21/45* (2013.01)
*H04W 12/08* (2021.01)

(52) U.S. Cl.
CPC .......... *H04W 12/068* (2021.01); *G06F 21/45* (2013.01); *H04W 12/08* (2013.01)

(58) Field of Classification Search
CPC .................................................. H04W 12/068
See application file for complete search history.

(56) References Cited

U.S. PATENT DOCUMENTS

| | | | | |
|---|---|---|---|---|
| 2004/0073815 | A1* | 4/2004 | Sanai ...................... | G06F 21/46 726/6 |
| 2013/0139228 | A1* | 5/2013 | Odaira .................. | H04W 12/08 726/5 |
| 2013/0141753 | A1* | 6/2013 | Kamoi ................. | H04N 1/4413 358/1.14 |
| 2016/0330202 | A1* | 11/2016 | Homma ................. | H04N 7/147 |
| 2017/0054694 | A1* | 2/2017 | Fujikami ............... | H04L 9/0863 |
| 2019/0372949 | A1* | 12/2019 | Sanciangco ........... | H04W 12/50 |

(Continued)

FOREIGN PATENT DOCUMENTS

| | | | | |
|---|---|---|---|---|
| EP | 2 169 991 | A1 | 3/2010 | |
| EP | 2693789 | A1 * | 2/2014 | ........... G06F 21/602 |
| EP | 3197194 | A1 * | 7/2017 | ......... H04L 63/0492 |

(Continued)

*Primary Examiner* — Ponnoreay Pich
(74) *Attorney, Agent, or Firm* — Canon U.S.A., Inc. I.P. Division

(57) ABSTRACT

A communication apparatus capable of performing wireless communication with an external apparatus includes an acquisition unit configured to acquire a communication setting including an authentication method parameter for the wireless communication, and a conversion unit configured to convert, in a case where the authentication method parameter included in the communication setting acquired by the acquisition unit indicates that a first authentication method is usable and a second authentication method with a security strength higher than that of the first authentication method is not usable, the authentication method parameter into an authentication method parameter indicating that the first authentication method and the second authentication method are both usable.

9 Claims, 10 Drawing Sheets

(56) References Cited

U.S. PATENT DOCUMENTS

2022/0272084 A1* 8/2022 Hyatt .................... H04W 12/40
2022/0386122 A1* 12/2022 Tsuchihashi ........ H04W 12/068

FOREIGN PATENT DOCUMENTS

| JP | 2013-257899 A | 12/2013 |
| JP | 2017163334 A | 9/2017 |
| JP | 2019-212242 A | 12/2019 |

* cited by examiner

FIG.2

| COMMUNICATION SETTING | | | ~200 |
|---|---|---|---|
| | COMMUNICATION SETTING NAME | setting_name | "SET_01" ~201 |
| | LAN TYPE | lantype | wifi ~202A |
| | Wi-Fi SETTING | | ~202B |
| | SSID | ssid | "ssid_01" |
| | CONNECTION MODE | method | infrastructure |
| | CHANNEL | channel | auto |
| | AUTHENTICATION METHOD | authentication | wpa_wpa2_psk ~204 |
| | ENCRYPTION METHOD | encryption | tkip_aes ~205 |
| | PASSWORD | password | "12345678" ~206 |
| | TCP/IP SETTING | | ~203 |
| | IP ADDRESS | ipaddress | auto |
| | ⋮ | ⋮ | ⋮ |

FIG.4A

| BEFORE CONVERSION | AFTER CONVERSION |
|---|---|
| WPA-Personal | WPA3-Personal |
| WPA2-Personal | WPA3-Personal |
| WPA/WPA2-Personal | WPA3-Personal |

FIG.4B

| BEFORE CONVERSION | AFTER CONVERSION |
|---|---|
| WPA-Personal | WPA/WPA2/WPA3-Personal |
| WPA2-Personal | WPA2/WPA3-Personal |
| WPA/WPA2-Personal | WPA/WPA2/WPA3-Personal |

FIG.6A

| BEFORE CONVERSION | AFTER CONVERSION | | |
|---|---|---|---|
| AUTHENTICATION METHOD | AUTHENTICATION METHOD | PASSWORD LENGTH | USABLE PASSWORD CHARACTERS |
| WPA-Personal | WPA3-Personal | 64 | HEXADECIMAL NUMBER |
| WPA-Personal | WPA3-Personal | 8 – 128 | HALF-WIDTH ALPHABETICAL LETTERS AND NUMBERS, AND HALF-WIDTH SYMBOLS (EXCEPT FOR SOME OF THEM) *USE AT LEAST ONE CAPITAL LETTER, ONE SMALL LETTER, ONE NUMBER, AND ONE SYMBOL (PRODUCT SPECIFICATION) |
| WPA2-Personal | WPA3-Personal | 64 | HEXADECIMAL NUMBER |
| WPA2-Personal | WPA3-Personal | 8 – 128 | HALF-WIDTH ALPHABETICAL LETTERS AND NUMBERS, AND HALF-WIDTH SYMBOLS (EXCEPT FOR SOME OF THEM) *USE AT LEAST ONE CAPITAL LETTER, ONE SMALL LETTER, ONE NUMBER, AND ONE SYMBOL (PRODUCT SPECIFICATION) |
| WPA/WPA2-Personal | WPA3-Personal | 64 | HEXADECIMAL NUMBER |
| WPA/WPA2-Personal | WPA3-Personal | 8 – 128 | HALF-WIDTH ALPHABETICAL LETTERS AND NUMBERS, AND HALF-WIDTH SYMBOLS (EXCEPT FOR SOME OF THEM) *USE AT LEAST ONE CAPITAL LETTER, ONE SMALL LETTER, ONE NUMBER, AND ONE SYMBOL (PRODUCT SPECIFICATION) |

FIG.6B

| BEFORE CONVERSION | AFTER CONVERSION | | |
|---|---|---|---|
| AUTHENTICATION METHOD | AUTHENTICATION METHOD | PASSWORD LENGTH | USABLE PASSWORD CHARACTERS |
| WPA-Personal | WPA/WPA2/WPA3-Personal | 8 ~ 63 | HALF-WIDTH ALPHABETICAL LETTERS AND NUMBERS, AND HALF-WIDTH SYMBOLS (EXCEPT FOR SOME OF THEM) |
| WPA-Personal | WPA/WPA2/WPA3-Personal | 64 | HEXADECIMAL NUMBER |
| WPA2-Personal | WPA2/WPA3-Personal | 8 ~ 63 | HALF-WIDTH ALPHABETICAL LETTERS AND NUMBERS, AND HALF-WIDTH SYMBOLS (EXCEPT FOR SOME OF THEM) |
| WPA2-Personal | WPA2/WPA3-Personal | 64 | HEXADECIMAL NUMBER |
| WPA/WPA2-Personal | WPA/WPA2/WPA3-Personal | 8 ~ 63 | HALF-WIDTH ALPHABETICAL LETTERS AND NUMBERS, AND HALF-WIDTH SYMBOLS (EXCEPT FOR SOME OF THEM) |
| WPA/WPA2-Personal | WPA/WPA2/WPA3-Personal | 64 | HEXADECIMAL NUMBER |

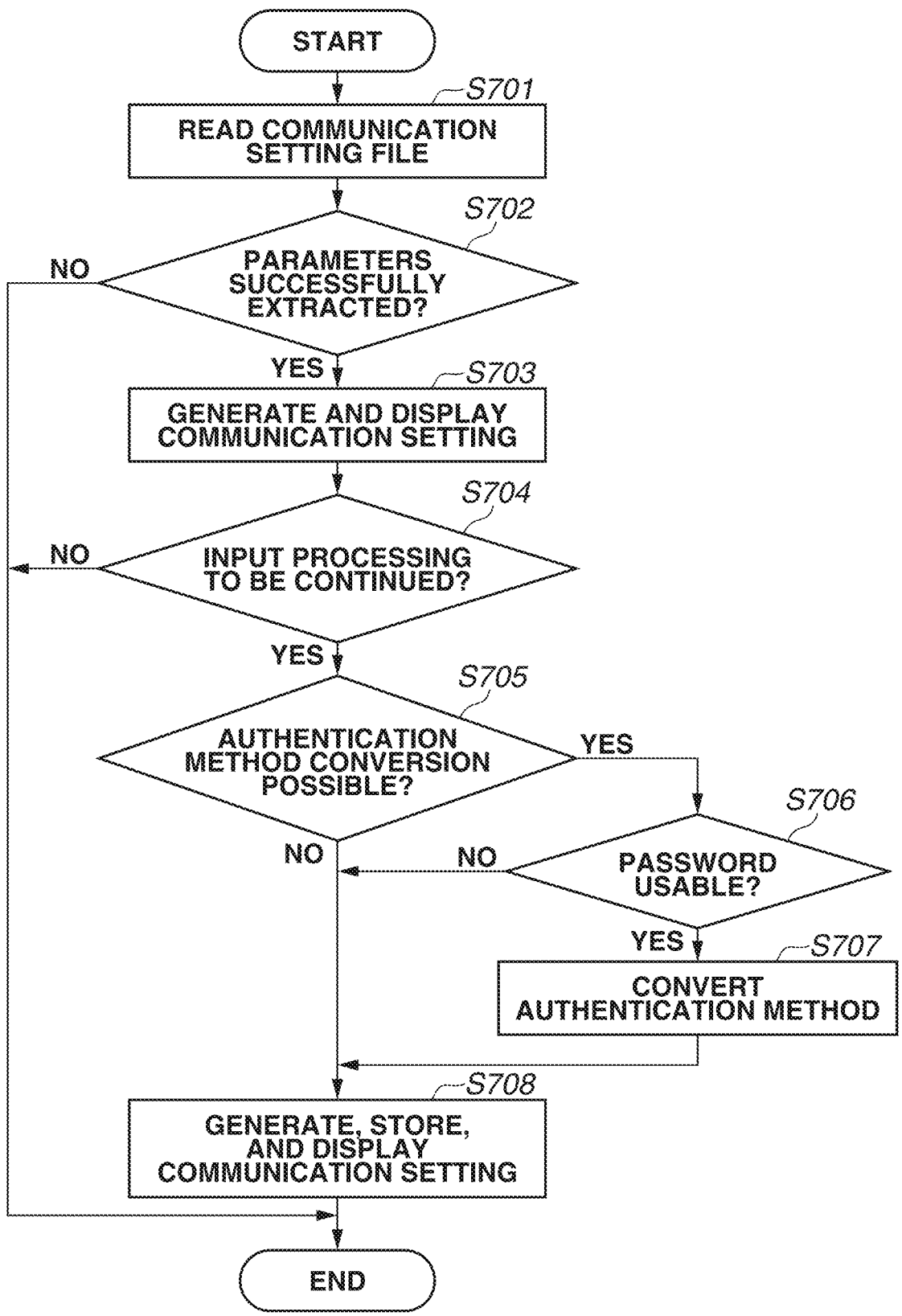

COMMUNICATION APPARATUS, CONTROL METHOD FOR COMMUNICATION APPARATUS, AND STORAGE MEDIUM STORING PROGRAM

BACKGROUND OF THE INVENTION

Field of the Invention

The present invention relates to a communication apparatus capable of performing wireless communication, a control method for the communication apparatus, and a storage medium storing a program.

Description of the Related Art

A camera function and a communication function are often built in many electronic apparatuses, such as a personal computer, a digital camera, a game machine, a tablet terminal, and a mobile telephone, and the electronic apparatuses wirelessly communicate with access points and other electronic apparatuses. Communication setting parameters used during wireless communication can be input directly by operating an electronic apparatus, and also can be input by reading a communication setting file in which communication setting parameters are written. The communication setting file includes communication setting parameters, such as an encryption method and a password, and the communication setting can be performed on the electronic apparatus by reading the communication setting file from an external memory such as a Secure Digital (SD) card, without performing cumbersome input operations.

Further, by inputting a communication setting file generated by another electronic apparatus, the electronic apparatus can share the communication setting with the other electronic apparatus.

Japanese Patent Application Laid-open No. 2019-212242 discusses an information processing apparatus that performs control, when setting data for each application is imported, whether to import the setting data based on a version and application information of the setting data.

Further, Japanese Patent Application Laid-open No. 2013-257899 discusses an information processing apparatus that executes, when an application program for a lower model is read by an upper model, the application for the lower model via an emulation driver built in the upper model.

In a case where a security strength of an authentication method written in a communication setting file is lower than that of an authentication method usable by the electronic apparatus, the electronic apparatus that has read the communication setting file cannot use an authentication method with a higher security strength. For example, a case is cited where an access point supports both Wireless Fidelity (Wi-Fi) Protected Access 2 (WPA2) and WPA3. If a first electronic apparatus that supports both WPA2 and WPA3 reads a communication setting file generated by a second electronic apparatus that only supports WPA2, the first electronic apparatus has to communicate with the access point based on WPA2 even though the first electronic apparatus has an environment in which WPA3 can be used.

In the case of the environment in which a communication setting with a high security strength can be used, communication in a communication setting with a higher security strength becomes possible if the communication setting with a higher security strength can be generated by using communication parameters of the input communication setting file.

SUMMARY OF THE INVENTION

The present invention is directed to a communication apparatus capable of performing communication with a higher security strength in a case where the communication apparatus acquires a communication setting.

According to an aspect of the present invention, a communication apparatus capable of performing wireless communication with an external apparatus includes an acquisition unit configured to acquire a communication setting including an authentication method parameter for the wireless communication, and a conversion unit configured to convert, in a case where the authentication method parameter included in the communication setting acquired by the acquisition unit indicates that a first authentication method is usable and a second authentication method with a security strength higher than that of the first authentication method is not usable, the authentication method parameter into an authentication method parameter indicating that the first authentication method and the second authentication method are both usable.

Further features of the present invention will become apparent from the following description of exemplary embodiments with reference to the attached drawings.

BRIEF DESCRIPTION OF THE DRAWINGS

FIG. 2 is a table illustrating a configuration of a communication setting file according to the first exemplary embodiment of the present disclosure.

FIGS. 4A and 4B are conversion tables each illustrating an authentication method according to the first exemplary embodiment of the present disclosure.

FIGS. 6A and 6B are conversion tables each illustrating an authentication method according to a second exemplary embodiment of the present disclosure.

FIG. 7 is a flowchart illustrating an operation of a digital camera according to the second exemplary embodiment of the present disclosure.

DESCRIPTION OF THE EMBODIMENTS

Hereinbelow, exemplary embodiments according to the present disclosure will be described with reference to the attached drawings.

The exemplary embodiments described below are merely examples to implement the present invention, and may be modified or changed as appropriate depending on configurations or various conditions of apparatuses to which the present invention is applied. Further, the exemplary embodiments may be combined as appropriate.

Internal Configuration of Digital Camera

Figure 1:
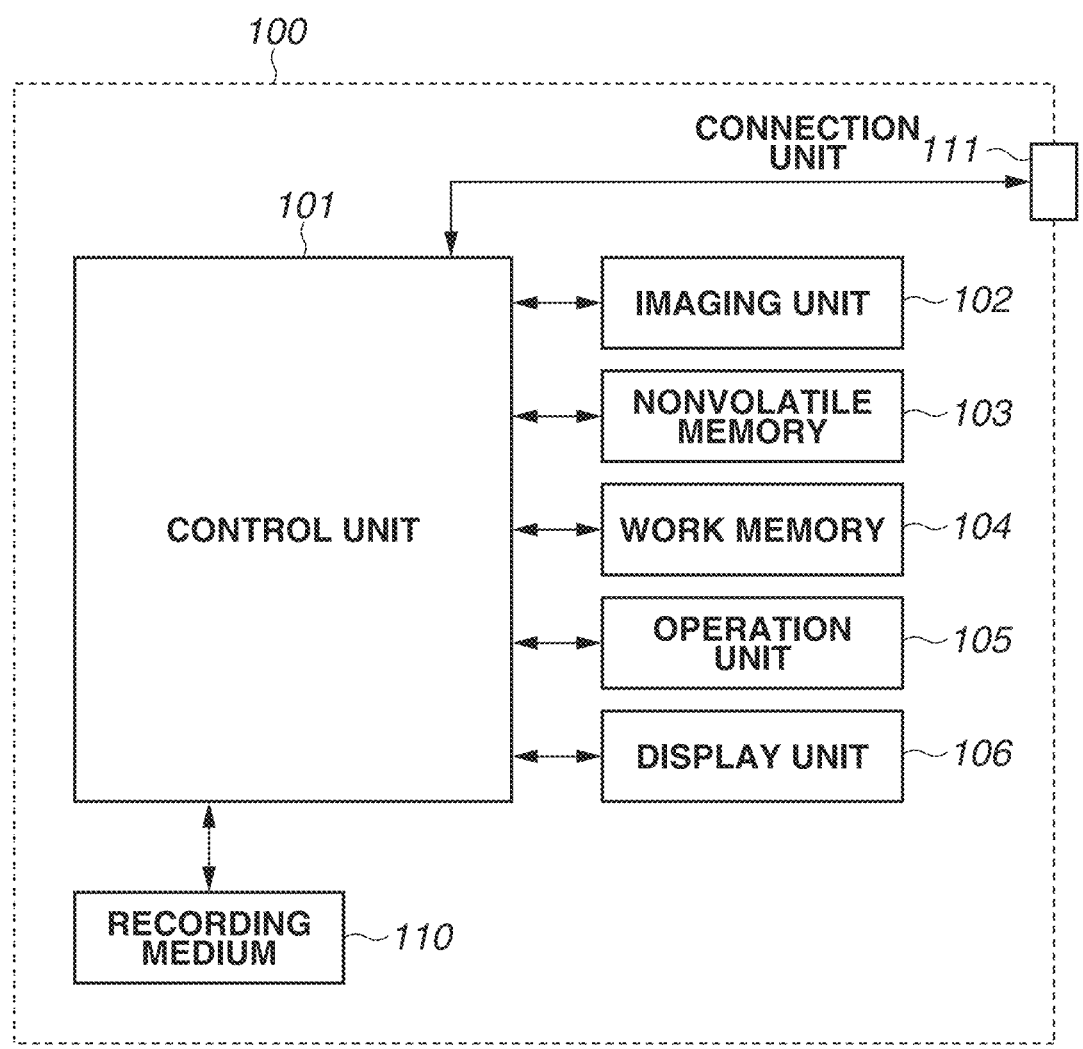
FIG. 1 is a block diagram illustrating a configuration of a digital camera according to a first exemplary embodiment of the present disclosure.

FIG. 1 is a block diagram illustrating a configuration example of a digital camera 100 as an example of a communication apparatus according to a first exemplary embodiment. In the present exemplary embodiment, a digital camera is described as an example of a communication apparatus. However, the communication apparatus is not limited thereto. For example, the communication apparatus may be an information processing apparatus such as a portable media player, a tablet device, or a personal computer.

A control unit 101 controls each unit of the digital camera 100 based on an input signal and a program described below. Alternatively, a plurality of hardware components may share processing to control the whole digital camera 100, instead of the control unit 101 controlling the whole digital camera 100.

An imaging unit 102 includes, for example, an optical lens unit and a lens control unit that controls an aperture operation, a zooming operation, and a focusing operation, and an image sensor that converts light (image) incident through the optical lens unit into an electrical image signal. As the image sensor, in general, a Complementary Metal Oxide Semiconductor (CMOS) sensor or Charge Coupled Device (CCD) sensor is used. Under control of the control unit 101, the imaging unit 102 converts, by the image sensor, object light focused by the optical lens unit included in the imaging unit 102 into an electrical signal, and outputs digital data as image data after performing noise reduction processing and other processing thereon. The digital camera 100 according to the present exemplary embodiment records the output image data in a recording medium 110 in compliant with a standard of Design rule for Camera File system (DCF).

A nonvolatile memory 103 is an electrically erasable and recordable nonvolatile memory, and stores a program and the like to be executed by the control unit 101 described below. A work memory 104 is used as a buffer memory for temporarily storing image data captured by the imaging unit 102, a memory for displaying an image on a display unit 106, and a work area for the control unit 101.

An operation unit 105 is used for receiving an instruction from a user to the digital camera 100. The operation unit 105 includes, for example, a power button for a user to instruct turning on and off power for the digital camera 100, a release switch for a user to instruct an image capturing, and a reproduction button for a user to instruct reproducing image data. Further, the operation unit 105 includes an operation member such as a dedicated connection button to start communication with an external apparatus via a connection unit 111 described below. Further, the operation unit 105 includes a touch panel formed on the display unit 106 (described below). In addition, the release switch includes a switch (SW) 1 and a SW 2. The SW 1 is turned on when the release switch is pressed half way (also referred to as a half stroke state). With this operation, the operation unit 105 receives an instruction for an image capturing preparation such as automatic focusing (AF) processing, automatic exposure (AE) processing, automatic white balance (AWB) processing, and electronic flash preliminary emission (EF) processing. Further, the SW2 is turned on when the release switch is fully pressed (also referred to as a full stroke state). With this operation, the operation unit 105 receives an instruction to start image capturing.

The display unit 106 displays a view finder image at a time of capturing an image, captured image data, and characters for a dialogical operation. The display unit 106 is not necessarily built in the digital camera 100. The digital camera 100 only needs to be able to connect to the display unit 106 located inside or outside of the digital camera 100, and to have a display control function of controlling the display of the display unit 106.

The recording medium 110 can record the image data output from the imaging unit 102.

The recording medium 110 may be configured to be attachable to and detachable from the digital camera 100, or may be built in the digital camera 100. In other words, the digital camera 100 only need to have an access means to access the recording medium 110.

The connection unit 111 is an interface for connecting with an external apparatus. The digital camera 100 according to the present exemplary embodiment can transmit and receive data to and from the external apparatus via the connection unit 111. For example, the digital camera 100 can transmit image data generated by the imaging unit 102 to the external apparatus via the connection unit 111. In addition, in the present exemplary embodiment, the connection unit 111 includes an interface for communicating with the external apparatus in compliance with a standard of Institute of Electrical and Electronics Engineers (IEEE) 802.11, what is called a wireless local area network (LAN). The control unit 101 implements the wireless communication with the external apparatus by controlling the connection unit 111. However, the communication method is not limited to the wireless LAN and may include, for example, an infrared communication method.

The connection unit 111 is an example of a first wireless communication unit.

Further, the connection unit 111 of the digital camera 100 according to the present exemplary embodiment includes an access point (AP) mode for operating as an access point in an infrastructure mode, and a client (CL) mode for operating as a client in the infrastructure mode. Thus, the digital camera 100 according to the present exemplary embodiment can operate as a CL device in the infrastructure mode by causing the connection unit 111 to operate in the CL mode.

In a case where the digital camera 100 operates as a CL device, the digital camera 100 can participate in a network established by an AP device by connecting to the AP device located around the digital camera 100. Further, the digital camera 100 according to the present exemplary embodiment can operate as a simplified AP device, which is a kind of AP device with the limited function, by causing the connection unit 111 to operate in the AP mode. When the digital camera 100 operates as the simplified AP device, the digital camera 100 establishes a network by itself. The apparatuses located around the digital camera 100 recognize the digital camera 100 as an AP device, and can participate in the network established by the digital camera 100. The program for causing the digital camera 100 to operate as described above is assumed to be stored in the nonvolatile memory 103.

The digital camera 100 according to the present exemplary embodiment is a kind of AP device, but is a simplified AP device that does not have a gateway function to transfer data received from a CL device to an internet provider. Accordingly, even if the digital camera 100 receives data from another apparatus participating in the network established by the digital camera 100, the digital camera 100 cannot transfer the data to a network such as the internet.

Configuration of Communication Setting File

FIG. 2 is a table illustrating a configuration of a communication setting file 200 used in the present exemplary embodiment.

The communication setting file 200 is a data set including all the communication setting parameters required for the digital camera 100 (imaging apparatus) to communicate. The communication setting file 200 includes information for specifying a communication setting (communication setting name 201), information about a communication interface (I/F) to be used (LAN type 202A), information about Wireless Fidelity (Wi-Fi) (Wi-Fi setting 202B), and information about Transmission Control Protocol/Internet Protocol (TCP/IP) (TCP/IP setting 203).

The Wi-Fi setting 202B includes information required for the Wi-Fi setting such as an authentication method 204, an encryption method 205, and a password 206, as information related to a security strength.

In the communication setting file 200, checksum is prepared for each communication parameter and used to check data damage and the like when the communication setting file 200 is read.

Input of Communication Setting File

A method of inputting the communication setting file 200 into the digital camera 100 will be described. The communication setting file 200 is obtained via the recording medium (memory card) 110 of the digital camera 100. First, the communication setting file 200 is stored in the recording medium 110 using an external apparatus or the like. Next, the recording medium 110 storing the communication setting file 200 is inserted in the digital camera 100, and the communication setting file 200 is input by operating the operation unit 105 according to a setting menu displayed on the display unit 106.

Figure 3A:
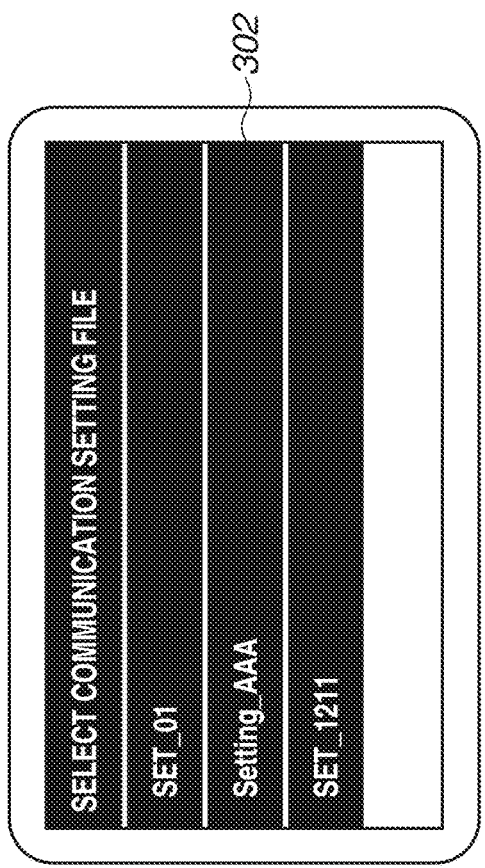
FIGS. 3A, 3B, 3C, and 3D are diagrams each illustrating a user interface (UI) of the digital camera according to the first exemplary embodiment of the present disclosure.

FIGS. 3A, 3B, 3C, and 3D are diagrams each illustrating a user interface (UI) of the digital camera 100 when the communication setting file 200 is input into the digital camera 100. Hereinbelow, with reference to FIGS. 3A to 3D, a sequence of inputting the communication setting file 200 into the digital camera 100 will be described. First, a communication setting addition menu illustrated in FIG. 3A is displayed on the display unit 106 of the digital camera 100.

In a case where a communication setting is input using the communication setting file 200, a menu 301 (input communication setting file) is selected. In a case where the menu 301 is selected, the screen shifts to a screen in FIG. 3B.

Figure 3B:
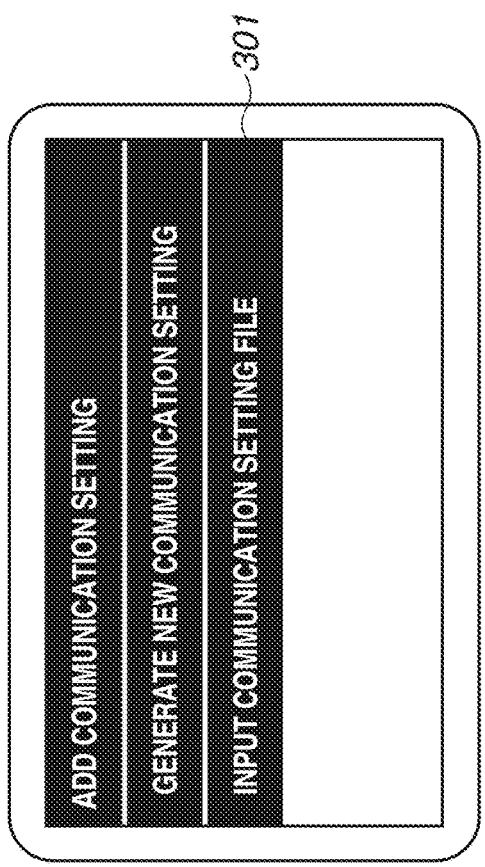

FIG. 3B illustrates a screen displaying a list of communication setting files that can be input into the digital camera 100. In a case where the recording medium 110 stores a plurality of communication setting files, the plurality of communication setting files is displayed on the list. The information displayed on the list may be a file name of the communication setting file, information for specifying a communication setting included in the communication setting file (communication setting name 201), or a representative parameter that allows the setting content to be easily specified such as a service set identifier (SSID). When a communication setting file to be input is selected from a menu 302, input processing of the communication setting file starts. When the processing is completed, the screen shifts to a screen in FIG. 3C. In the input processing, file damage is checked using checksum provided in the communication setting file. In this case, if it is determined that the file damage is found, the fact that the file is not input is displayed on the display unit 106, and the screen does not shift to the screen in FIG. 3C.

Figure 3C:
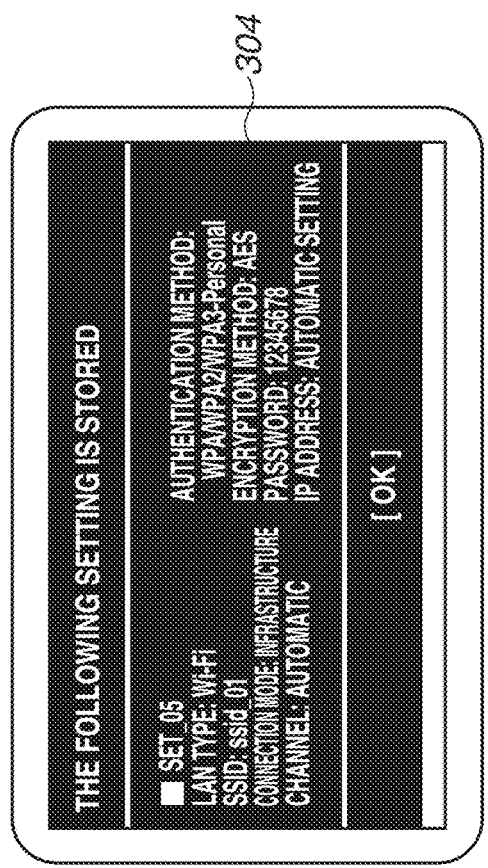

FIG. 3C illustrates a content 303 of a communication setting stored in the selected communication setting file. An operator checks the displayed content 303 to determine whether the content 303 of the communication setting file is to be input. In a case where the displayed communication setting is not to be input, the operator selects a [CANCEL] button. If the [CANCEL] button is selected, the screen returns to the screen in FIG. 3B. In a case where the displayed communication setting is to be input, the operator selects an [OK] button. If the [OK] button is selected, generation processing of the communication setting to be stored in the digital camera 100 starts. If the processing is completed, the screen shifts to a screen in FIG. 3D. The generation processing of the communication setting will be described below.

Figure 3D:
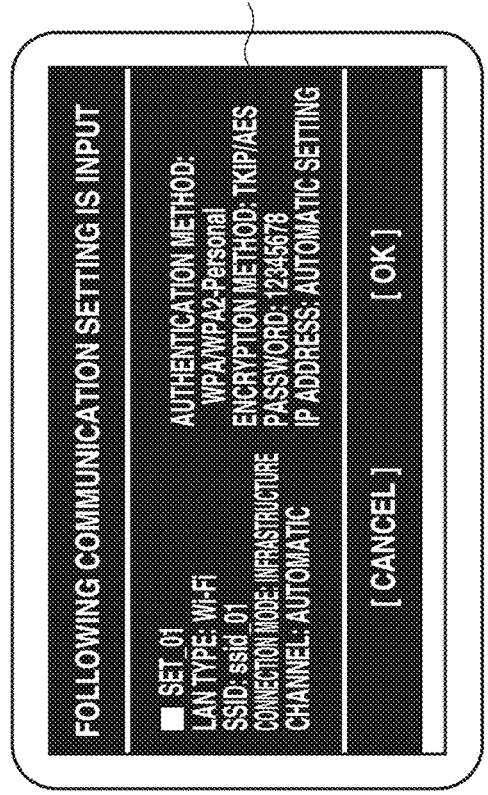

FIG. 3D illustrates a content 304 of the communication setting generated by communication setting generation processing (described below). The generated communication setting is stored in the nonvolatile memory 103 of the digital camera 100. In the present exemplary embodiment, an input check screen is displayed to the operator as in FIG. 3C, but the digital camera 100 may start the communication setting generation processing without displaying the check screen after a communication setting file is selected on the screen in FIG. 3B, and then the screen may shift to the screen in FIG. 3D. Further, in a case where the operator does not need to select a communication setting file, for example, in a case where only one communication setting file is stored in the recording medium 110, the display of the list of the communication setting files in FIG. 3B may be omitted.

Generation of Communication Setting

A description will be given of a method of generating a communication setting to be stored in the digital camera 100, using communication setting parameters obtained from the input communication setting file. To generate a communication setting, the parameters are converted using a conversion table for an authentication method in FIG. 4A or FIG. 4B. The conversion table differs depending on a specification of the authentication method and a product specification of a digital camera to which the communication setting is input. FIGS. 4A and 4B illustrate examples of the conversion tables in the digital camera 100 that can use WPA, WPA2, and WPA3.

The conversion table in FIG. 4A is used for converting the authentication method into WPA3 with a highest security strength usable by the digital camera 100. In a case where the authentication method before conversion is a personal mode in WPA and/or WPA2, the authentication method is converted into a personal mode in WPA3 (WPA3-Personal).

The conversion table in FIG. 4B is used for converting the communication setting into a communication setting that uses WPA3 if it is possible to use WPA3 while keeping compatibility with the communication setting before conversion. In a case where the authentication method before conversion includes WPA and WPA2, the authentication method is converted to include WPA3. The WPA/WPA2/WPA3-Personal indicates that a personal mode in WPA, WPA2, or WPA3 can be used. In other words, the original authentication methods WPA and WPA2, and the new authentication method WPA3 can be used. In a case where the connection mode is an infrastructure mode, the digital camera 100 starts to try authentication, to an opposed device, with WPA3-Personal with the highest security strength, and if it is not authenticated, next tries authentication, to the opposed device, with WPA2-Personal with the next highest security strength. In a case where the connection mode is a simplified access point mode, the digital camera 100 establishes a network capable of communicating in WPA3-Personal, WPA2-Personal, or WPA-Personal, and selects an authentication method depending on the connection mode of the opposed device.

A password usable in WPA-Personal and WPA2-Personal is also usable in WPA3-Personal. For this reason, in the present exemplary embodiment, check and conversion of the password are not performed.

At the end, a communication setting is generated using the authentication method converted by using the conversion table and other parameters read from the communication setting file.

Operation of Digital Camera

Figure 5:
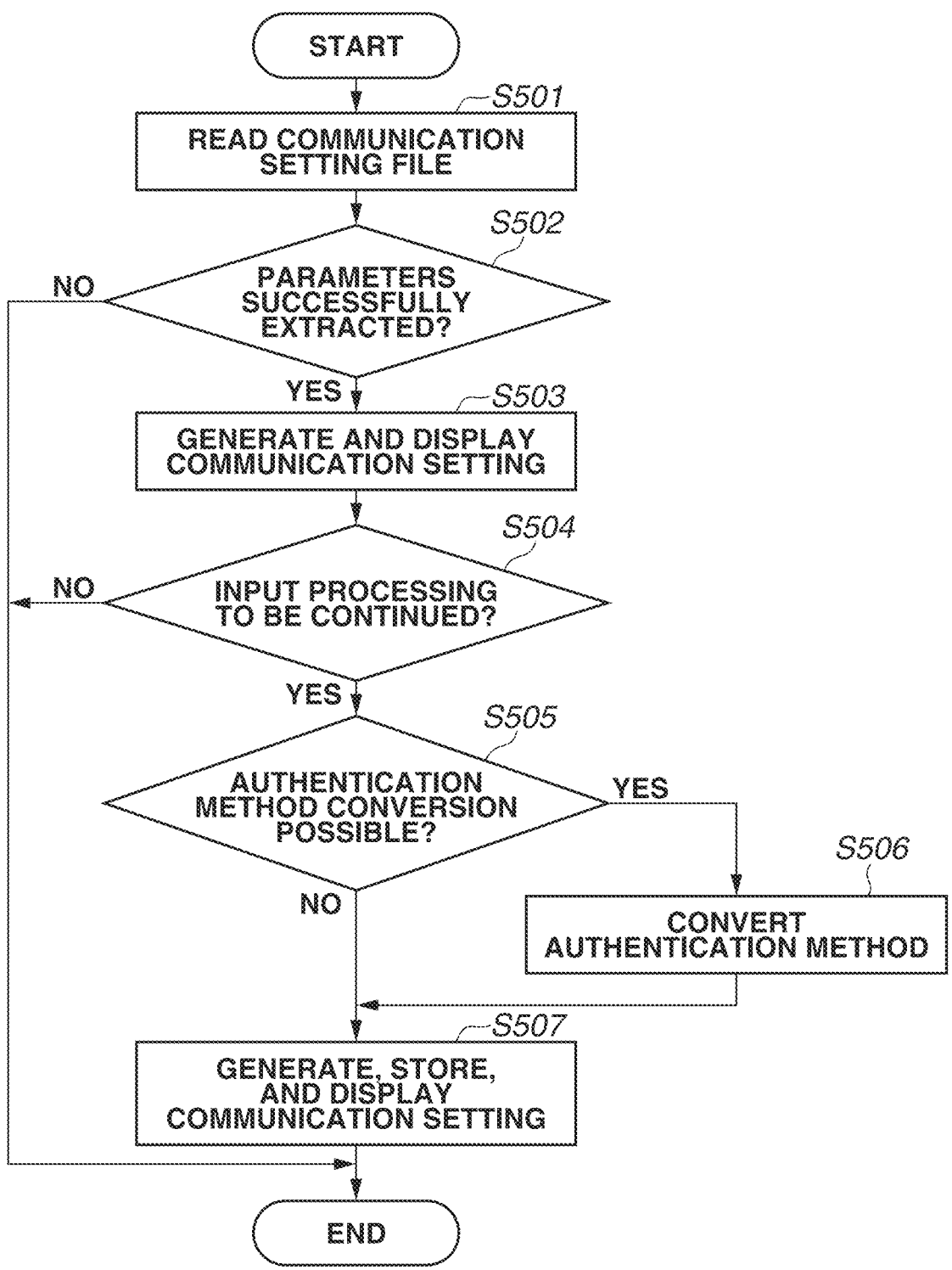
FIG. 5 is a flowchart illustrating an operation of the digital camera according to the first exemplary embodiment of the present disclosure.

FIG. 5 is a flowchart illustrating an operation of the digital camera 100. Hereinbelow, with reference to FIG. 5, a description will be given of an operation procedure of the digital camera 100 according to the present exemplary embodiment from an input of the communication setting file to a storage of the communication setting. Here, the communication setting file is stored in the recording medium 110 in advance, and the recording medium 110 is inserted in the digital camera 100.

In step S501, the control unit 101 of the digital camera 100 reads the communication setting file stored in the recording medium 110. The communication setting file to be read may be selected by an operator as in FIG. 3B. When the control unit 101 of the digital camera 100 reads the communication setting file, the processing proceeds to step S502.

In step S502, the control unit 101 extracts parameters from the read communication setting file. The control unit 101 checks whether the read communication setting file includes data damage or all necessary parameters using checksum. In a case where no errors are detected, the control unit 101 determines that the extraction of the parameters is successfully completed (YES in step S502), and the processing proceeds to step S503. In a case where the extraction of the parameters has failed (NO in step S502), the processing ends.

In step S503, the control unit 101 generates a communication setting using the extracted parameters. Then, the control unit 101 displays the generated communication setting as in FIG. 3C, and the processing proceeds to step S504. In step S504, the control unit 101 prompts the operator to confirm whether to continue the input processing of the generated communication setting. In a case where the input processing is to be continued (YES in step S504), the processing proceeds to step S505. In a case where the input processing is not to be continued (NO in step S504), the processing ends. The processing in steps S503 and S504 may be omitted, and the processing may proceed from step S502 to step S505.

In step S505, the control unit 101 determines whether a parameter of the extracted authentication method can be converted by using the conversion table in FIG. 4A or FIG. 4B. If the parameter of the extracted authentication method is described in a column of "before conversion" in FIG. 4A or FIG. 4B, the conversion is possible. If possible (YES in step S505), the processing proceeds to step S506. If not possible (NO in step S505), the processing proceeds to step S507. In step S506, the extracted parameter of the authentication method is converted into a parameter in a column of "after conversion" in FIG. 4A or FIG. 4B. After the conversion, the processing proceeds to step S507.

In step S507, the control unit 101 generates a communication setting by using the authentication method parameter selected in step S505 or step S506 and other parameters extracted from the communication setting file. Then, the control unit 101 stores the communication setting in the nonvolatile memory 103 of the digital camera 100. At the end, the control unit 101 displays, on the display unit 106, the stored communication setting as in FIG. 3D, and the processing ends.

In the present exemplary embodiment, the description is given of the method of converting the authentication method extracted from the read communication setting file into the authentication method with a higher security strength using the conversion table. As described above, a communication method with a higher security strength can be used when a communication setting is read in a digital camera that can use a communication method with a security strength higher than that of the communication setting written in the communication setting file. Further, as described above, the conversion table is designed based on the communication specification and the product specification. In a case where the conversion table in FIG. 4B is used, the communication setting before conversion and the communication setting after conversion can be set compatible. Even in a case where the opposed device only supports the communication method with a security strength written in the communication setting file, the digital camera that has read the communication setting file can communicate with the opposed device with the original security strength.

In the first exemplary embodiment, the description is given of the method of converting the authentication method extracted from the communication setting file using the conversion table. Check of the password is not necessary in the authentication method according to the first exemplary embodiment, as the communication specification. Accordingly, password check processing is not performed. However, in the future, it is envisaged that an authentication method with a higher security strength in which a password for the authentication method before conversion is not usable may be developed. In a case where the communication setting file is read by a digital camera that supports the authentication method with the higher security strength, it is necessary to check whether the password in the communication setting file is usable for the authentication method after conversion. Further, in a case where the number of characters, usable characters, or a combination of characters is limited as a product specification of the digital camera, it is necessary to check the password. Thus, in a second exemplary embodiment, a description will be given of a method of checking whether a password extracted from a communication setting file is usable after checking whether an authentication method can be converted by using a conversion table.

Configurations of the digital camera 100 and the communication setting file 200 are similar to those of the first exemplary embodiment. Thus, detailed descriptions thereof are omitted.

Generation of Communication Setting

A description will be given of a method of generating a communication setting to be stored in the digital camera 100 by using communication setting parameters obtained from the input setting file. To generate a communication setting, a conversion table of an authentication method illustrated in FIG. 6A or 6B is used to convert the parameters. The conversion table differs depending on a specification of an authentication method and a product specification of a digital camera to which the communication setting is input. FIGS. 6A and 6B illustrate examples of the conversion table for the digital camera 100 that can use WPA, WPA2, and WPA3.

The conversion tables in FIGS. 6A and 6B are tables respectively generated by adding, to the conversion tables in FIGS. 4A and 4B, password specification columns (a "password length" column and a "usable password characters" column) usable in the authentication method after conversion. Similar to the first exemplary embodiment, the control unit 101 checks, after checking whether the authentication method extracted from the communication setting file can be converted, whether the password extracted from the communication setting file is usable according to the password specification columns in each of the conversion tables.

Operation of Digital Camera

FIG. 7 is a flowchart illustrating an operation of the digital camera 100. Hereinbelow, with reference to FIG. 7, a description will be given of an operation procedure of the digital camera 100 according to the present exemplary embodiment from an input of the communication setting file to a storage of the communication setting. Here, the communication setting file is stored in the recording medium 110 in advance, and the recording medium 110 is inserted in the digital camera 100.

Processing in steps S701 to S705 is similar to that in steps S501 to S505 in FIG. 5, and thus a description thereof is omitted. In step S706, the control unit 101 checks whether the extracted password is usable in the authentication method after conversion by using the conversion table in FIG. 6A or FIG. 6B. The control unit 101 checks whether the password length of the extracted password is within a range of the password length in the conversion table and the characters used in the extracted password correspond to the usable characters in the conversion table. If both conditions are satisfied, the control unit 101 determines that the password extracted from the communication setting file is usable in the authentication method after conversion. If usable (YES in step S706), the processing proceeds to step S707. If not usable (NO in step S706), the processing proceeds to step S708. Processing in steps S707 and S708 is similar to that in steps S506 and S507 in FIG. 5, and thus a description thereof is omitted.

In the present exemplary embodiment, the description is given of the method of converting the authentication method extracted from the communication setting file in consideration of the password. Accordingly, the communication setting in which the combination of the authentication method and the password does not conflict with the communication specification and the product specification can be generated.

In the first and second exemplary embodiments, the description is given of the method of converting the authentication method extracted from the communication setting file into the authentication method with a higher security strength within the range in which the extracted password is usable. However, with this method, the authentication method extracted from the communication setting file cannot be converted into an authentication method in which change of the password is required. Further, the method cannot deal with a use case in which an operator desires to use the read communication setting file unchanged. Thus, in a third exemplary embodiment, a description will be given of an imaging apparatus (digital camera) that displays, after reading the communication setting file, a screen to the operator for checking whether the authentication method or the password is to be changed, to generate a communication setting.

Configurations of the digital camera 100 and the communication setting file 200 are similar to those of the first exemplary embodiment. Thus, detailed descriptions thereof are omitted.

Operation of Digital Camera

Figure 8:
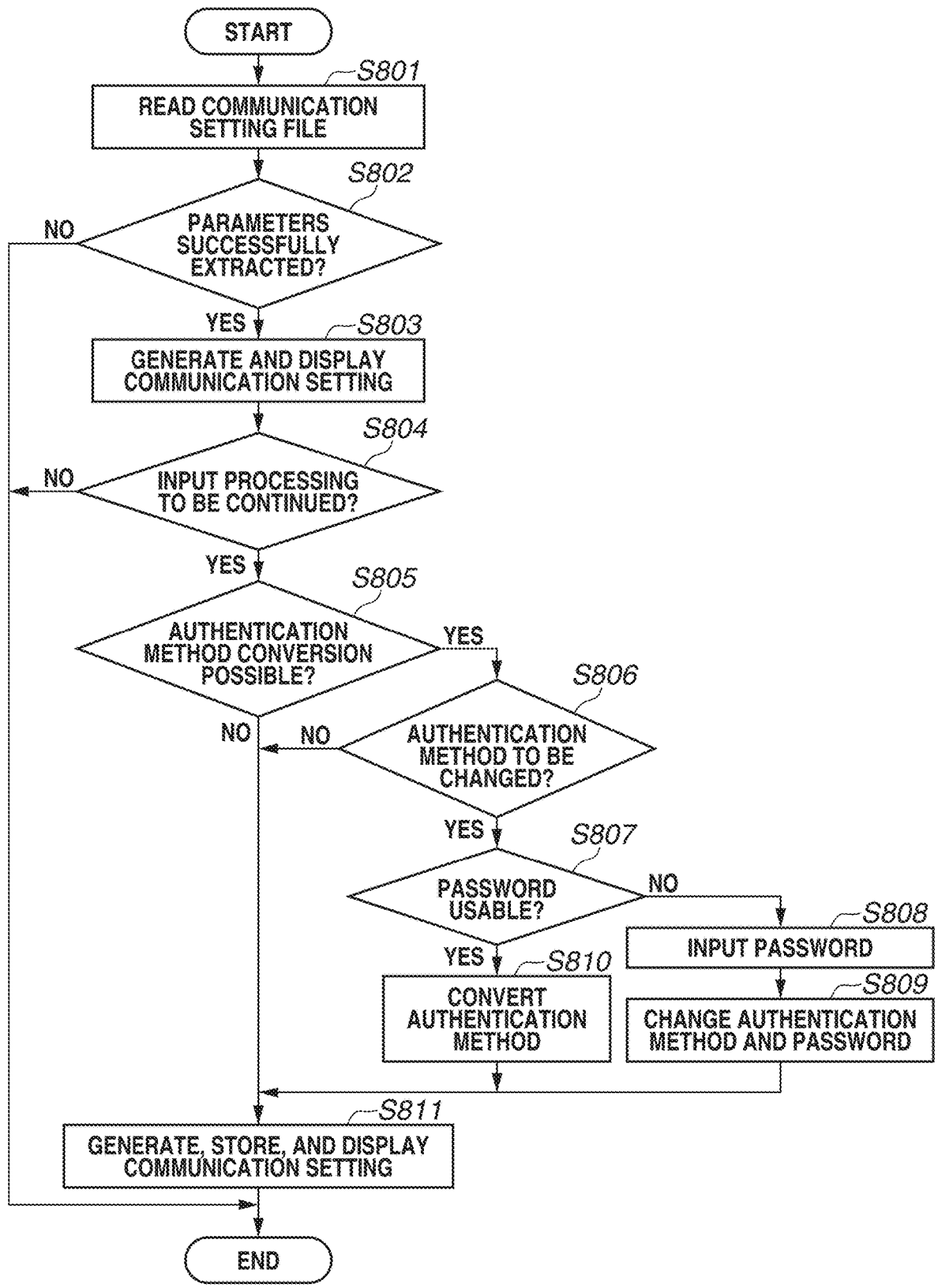
FIG. 8 is a flowchart illustrating an operation of a digital camera according to a third exemplary embodiment of the present disclosure.

FIG. 8 is a flowchart illustrating an operation of the digital camera 100. Hereinbelow, with reference to FIG. 8, a description will be given of an operation procedure of the digital camera 100 according to the present exemplary embodiment from an input of a communication setting file to a storage of the communication setting. Here, the communication setting file is stored in the recording medium 110 in advance, and the recording medium 110 is inserted in the digital camera 100.

Figure 9A:
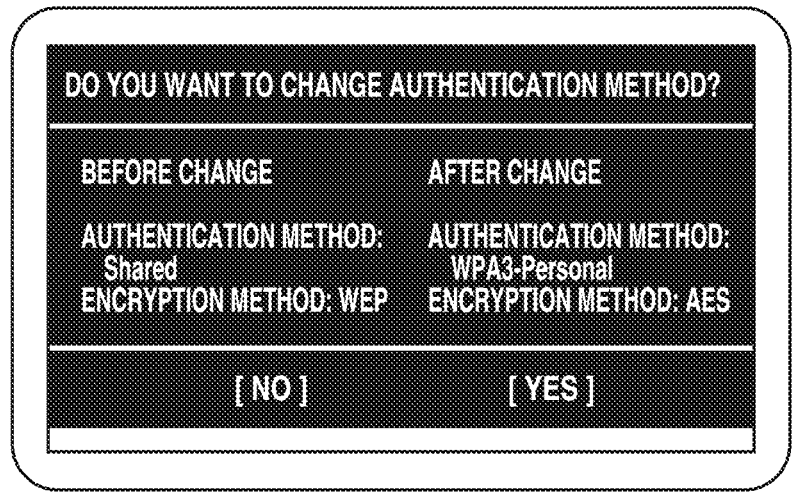
FIGS. 9A and 9B are diagrams each illustrating a UI of the digital camera according to the third exemplary embodiment of the present disclosure.

Processing in steps S801 to S805 is similar to that in steps S501 to S505 in FIG. 5, and thus a description thereof is omitted. In step S806, the control unit 101 displays a screen (reception screen) as in FIG. 9A to the operator to receive an instruction regarding whether to change the authentication method. The authentication method after change displayed on the screen is selected from the column of the authentication method after conversion using the conversion table in FIG. 6A or FIG. 6B, as in step S505. At this time, in a case where the authentication method written in the communication setting file does not exist in the columns of the authentication method before conversion in FIGS. 6A and 6B, an authentication method with a highest security strength usable by the digital camera 100 is displayed. In a case where the authentication method is to be changed, the operator selects a [YES] button. In a case where the authentication method is not to be changed, the operator selects a [NO] button.

Figure 9B:
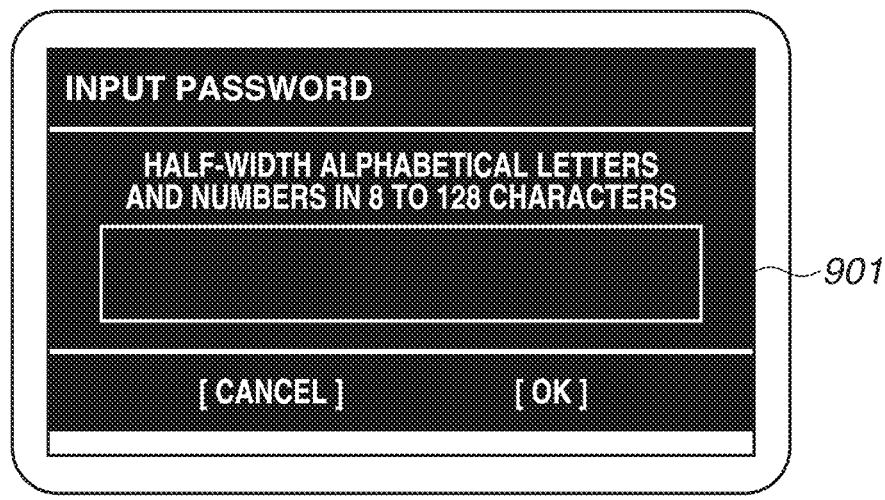

In a case where the authentication method is to be changed (YES in step S806), the processing proceeds to step S807. In a case where the authentication method is not to be changed (NO in step S806), the processing proceeds to step S811. In step S807, as in step S706, the control unit 101 checks, by using the conversion table, whether the password is usable. If usable (YES in step S807), the processing proceeds to step S810. If not usable (NO in step S807), the processing proceeds to step S808. In step S808, the control unit 101 displays a screen as in FIG. 9B to prompt the operator to input a password to be changed. When the operator selects a password input box 901, the control unit 101 displays an input means, such as a software keyboard, on the screen to prompt the operator to input a password. At this time, the control unit 101 checks whether the password input by the operator is usable in the authentication method after change. Items to be checked are the password length and the usable characters. When a usable password is input, the screen returns to the screen in FIG. 9B. In a case where the operator uses the input password, the operator selects an [OK] button. When the operator selects the [OK] button, the processing proceeds to step S808. In a case where the operator does not use the input password, the operator presses a [CANCEL] button to end the processing.

In step S809, the control unit 101 changes the authentication method to that changed and confirmed in step S806 and the password to that input in step S808, in the parameters extracted from communication setting file 200. Processing in steps S810 and S811 is similar to that in steps S707 and S708, and thus a description thereof is omitted.

The present invention is described above based on the exemplary embodiments. However, the present invention is not limited to those exemplary embodiments and includes various embodiments in a range without departing from the scope of the present invention. Further, in the exemplary embodiments described above, as the method of importing the communication setting file, the recording medium is used. However, the communication setting file may be obtained through communication with an external apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2021-088229, filed May 26, 2021, which is hereby incorporated by reference herein in its entirety.

What is claimed is:

1. A communication apparatus capable of performing wireless communication with an external apparatus, the communication apparatus comprising:
   an acquisition unit configured to acquire a communication setting including an authentication method parameter for the wireless communication; and
   a conversion unit configured to convert, in a case where the authentication method parameter included in the communication setting acquired by the acquisition unit indicates that a first authentication method is usable and a second authentication method with a security strength higher than that of the first authentication method is not usable, the authentication method parameter into an authentication method parameter indicating that the first authentication method and the second authentication method are both usable.

2. The communication apparatus according to claim 1, wherein the communication setting acquired by the acquisition unit includes a password for the wireless communication.

3. The communication apparatus according to claim 2, further comprising a determination unit configured to determine whether the password included in the communication setting acquired by the acquisition unit supports the second authentication method,
   wherein the conversion unit converts, in a case where the determination unit determines that the password included in the communication setting acquired by the acquisition unit supports the second authentication method, the authentication method parameter into the authentication method parameter indicating that the first authentication method and the second authentication method are both usable.

4. The communication apparatus according to claim 3, further comprising a first display unit configured to perform display, in a case where the determination unit determines that the password included in the communication setting acquired by the acquisition unit does not support the second authentication method, to prompt an operator to change the password.

5. The communication apparatus according to claim 1, further comprising a reception unit configured to receive, in a case where an authentication method parameter included in a communication setting acquired by the acquisition unit indicates that a first authentication method is usable and a second authentication method with a security strength higher than that of the first authentication method is not usable, an instruction regarding whether to convert the authentication method parameter into the authentication method parameter indicating that the first authentication method and the second authentication method are both usable,
   wherein the conversion unit converts, in response to the instruction received by the reception unit, the authentication method parameter into the authentication method parameter indicating that the first authentication method and the second authentication method are both usable.

6. The communication apparatus according to claim 1, wherein the first authentication method is Wi-Fi Protected Access (WPA) or WPA2, and the second authentication method is WPA3.

7. The communication apparatus according to claim 1, wherein the acquisition unit acquires the communication setting by reading the communication setting from a memory card.

8. A non-transitory computer-readable storage medium storing a program for causing a computer to function as the units according to claim 1.

9. A control method for a communication apparatus capable of performing wireless communication with an external apparatus, the control method comprising:
   acquiring a communication setting including an authentication method parameter for the wireless communication; and
   converting, in a case where the authentication method parameter included in the acquired communication setting indicates that a first authentication method is usable and a second authentication method with a security strength higher than that of the first authentication method is not usable, the authentication method parameter into an authentication method parameter indicating that the first authentication method and the second authentication method are both usable.

* * * * *